United States Patent [19]

Allinikov

[11] 4,097,776
[45] Jun. 27, 1978

[54] COATED ELECTROLUMINESCENT PHOSPHORS

[75] Inventor: Sidney Allinikov, Yellow Springs, Ohio

[73] Assignee: The United States of America as represented by the Secretary of the Air Force, Washington, D.C.

[21] Appl. No.: 781,228

[22] Filed: Mar. 25, 1977

[51] Int. Cl.² .......................... H01J 1/62; G02F 1/13; C09K 3/34; B05D 5/06
[52] U.S. Cl. ...................... 313/502; 350/350; 427/66; 427/220; 428/1; 428/323; 428/327; 428/335; 428/403; 428/917
[58] Field of Search ................. 313/502, 503; 350/160 LC; 427/66, 220; 428/1, 403, 917, 335, 323, 327

[56] References Cited

U.S. PATENT DOCUMENTS 3,775,631   11/1973   Morikawa ........................... 315/502

*Primary Examiner*—William R. Dixon, Jr.
*Attorney, Agent, or Firm*—Joseph E. Rusz; Cedric H. Kuhn

[57] ABSTRACT

An electroluminescent phosphor coated with a liquid crystal. When used in electroluminescent applications, the coated phosphors are highly resistant to moisture and operate at reduced temperatures at high voltages and frequencies.

10 Claims, 1 Drawing Figure

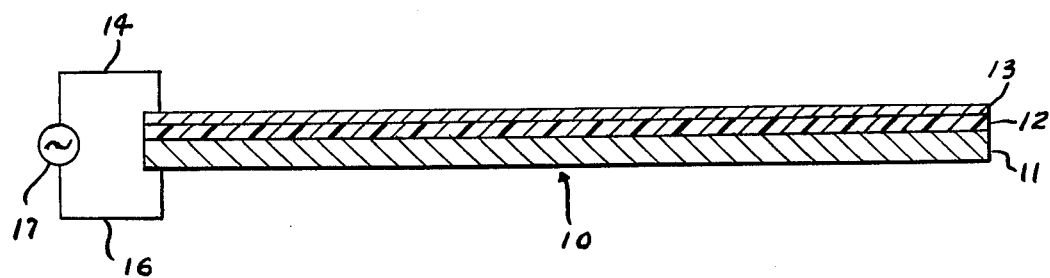

COATED ELECTROLUMINESCENT PHOSPHORS

RIGHTS OF THE GOVERNMENT

The invention described herein may be manufactured or used by or for the Government of the United States for all governmental purposes without the payment of any royalty.

FIELD OF THE INVENTION

This invention relates to electroluminescent phosphors coated with a liquid crystal. In one aspect it relates to electroluminescent devices which incorporate the phosphors.

BACKGROUND OF THE INVENTION

Electroluminescent phosphors are well known materials that have been used extensively in fabricating light transmitting devices or structures. These electroluminescent devices, often in the form of panels and films and sometimes referred to as lamps, generally comprise a layer of a dielectric material which serves as a matrix for a phosphor dispersed therein. The dielectric matrix layer is disposed between and in contact with electrodes, at least one of which is a light-transmitting electrode. When the electrodes are connected to a source of alternating current, light is produced by the phosphor and transmitted through the light-transmitting electrode. In general, the higher the voltage and frequency of the alternating current the more intense is the light that is generated.

One of the problems associated with electroluminescent devices arises because of the sensitivity of the phosphors to moisture. If unprotected, the phosphor-dielectric deteriorates when exposed to moisture in the atmosphere, thereby shortening the effective life of the device. Another problem that is encountered results from the heat generated by the phosphor. The heat causes degradation of the phosphor and ultimately failure of the device to transmit light. The deleterious effect of heat is especially pronounced at high voltages and frequencies.

Many U.S. patents have issued which are concerned with various aspects of electroluminescent devices. Examples of such prior art patents include U.S. Pat. Nos. 3,247,414; 3,264,133; 3,274,419; and 3,313,652. These patents disclose various phosphors and dielectric matrices therefor as well as various electrodes that can be used in fabricating the devices. The patentees in the last three of the cited patents recognize that moisture has a harmful effect on the devices. In U.S. Pat. Nos. 3,274,419 and 3,313,652, it is disclosed that for moisture protection the phosphor-dielectric layer or the entire device should be encapsulated with a protective film. In U.S. Pat. No. 3,264,133 the patentee discusses several solutions to the problem that are disclosed in the patent art, including encapsulation of the phosphor in a glass globule, with a colloidal silica, or in a coating of barium titanate. However, the patentee indicates that each of these solutions has its disadvantages and discloses as his solution an encapsulating coating of high dielectric titanium dioxide. None of the prior art patents appears to recognize that the sensitivity of the phosphor to heat as well as to moisture is a factor to consider in fabricating electroluminescent devices.

It is a principal object of the present invention, therefore, to provide a phosphor coated with a liquid crystal, which is insensitive to moisture and is not subject to overheating.

Another object of the invention is to provide a method for preparing the coated phosphors.

A further object of the invention is to provide an improved electroluminescent device.

Other objects and advantages of the invention will become apparent to those skilled in the art upon consideration of the accompanying disclosure and the FIGURE which is a schematic representation, in cross section, of an electroluminescent device embodying the present invention.

SUMMARY OF THE INVENTION

Broadly speaking, the present invention resides in an electroluminescent phosphor coated with a coating of a liquid crystal or a mixture of liquid crystals. It has been discovered that the liquid crystal coating protects the phosphor against deterioration when exposed to moisture. Furthermore, the liquid crystal coating has been found to act as a heat sink for heat that is generated by the phosphor. It is known that liquid crystals melt at certain well defined temperatures dependent upon the particular liquid crystal. It is thus possible to use a particular liquid crystal or tailor a liquid crystal mixture so that it will melt at about the temperature to which the phosphor is heated as a result of being disposed in an electric field. As mentioned above, the higher the voltage and frequency of the alternating current applied to the electrodes of an electroluminescent device the higher is the operating temperature of the phosphor. In accordance with the present invention, the liquid crystal coating melts at about the operating temperature of the phosphor so as to provide an effective heat sink and prevent overheating and concomitant degradation of the phosphor.

In one embodiment, the present invention lies in an electroluminescent device comprising a layer of electroluminescent phosphor particles coated with a liquid crystal or a mixture of liquid crystals, the coated particles being dispersed in a dielectric matrix material; and an electrode member or layer adhered to each face or surface of the coated phosphor-containing layer, at least one electrode member being a light transmitting layer.

Referring now to the drawing, there is illustrated a schematic cross sectional view of an electroluminescent device 10. The device includes an electrode 11 which, as shown, functions as a conductive base plate or substrate. Electrode 11 can be formed of any suitable conductive material, such as aluminum, copper, silver, gold, iron, and the like. It is also within the scope of the invention to employ as the base plate a sheet of a plastic material, e.g., polyethylene, polypropylene or polyvinyl chloride, coated with a metal or metal oxide. Methods for coating plastic sheets, e.g., by vapor deposition, are well within the skill of the art.

A layer 12 of a dielectric material having a liquid crystal-coated phosphor dispersed or embedded therein is positioned in contact with electrode or conductive layer 11. In general, any of the dielectric materials disclosed in the prior art as being suitable phosphor media can be used. Dielectric organic plastic materials have been found to be particularly useful. Examples of such materials include epoxy resins, polystyrene, polyethylene, polyvinyl butyral, polyvinyl chloride, polyvinyl acetate, polyvinyl alcohol, polyesters, polyamides, polyacrylonitrile, polyacrylate, polymethylmethacrylate, and the like. It is also within the purview of the invention to utilize an inorganic medium, such as barium or strontium titanate.

Any of the well known electroluminescent phosphors can be employed in the practice of the present invention. As the phosphor it is often preferred to use zinc sulfide doped with copper. However, the compound can be doped with other elements such as manganese, mercury, silver, iron and cadmium as well as with rare earth elements to provide satisfactory phosphors. Suitable phosphors can also be prepared by activating or doping other compounds such as zinc selenide, boron nitride and aluminum nitride. Phosphors are available from commercial sources and are supplied in particulate form, i.e., as finely divided particles.

Prior to dispersion in the dielectric medium, the phosphor particles are coated with a liquid crystal or mixture of liquid crystals. Liquid crystals are well known, commercially available compounds which are described in the literature, e.g., Glenn H. Brown et al., A Review of the Structure and Physical Properties of Liquid Crystals, CRC Press, Cleveland, Ohio (1971). Exemplary liquid crystals include p-azoxyanisol; 4-methoxybenzylidene-4'-cyanoaniline; di-4-methoxybenzylidene-2,2'-dichloro-4,4'-diaminobiphenyl; di-4-methoxybenzylidene-2,6-diaminonaphthalene; 2-hydroxy-3,6-bis(4-n-butylphenyl)pyrazine; p-quinquephenyl; bis-2,5-(4-methoxybenzylidene)cyclopentanone; 4-n-octyloxybenzoic acid (dimer); and the like. It is often preferred to utilize cholesteryl esters having the following structural formula:

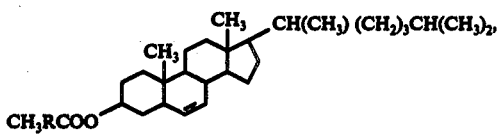

wherein R is an alkylene radical or a divalent aromatic radical. The alkylene radical can contain from 1 to 24, inclusive, preferably from 1 to 18, carbon atoms. Examples of divalent aromatic radicals include the following:

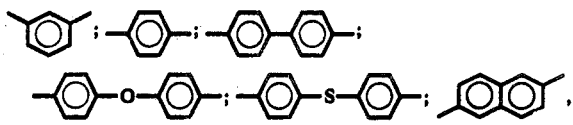

and the like. Specific examples of cholesteryl esters include cholesteryl oleate, cholesteryl decanoate, cholesteryl nonanoate, cholesteryl uracate, cholesteryl propionate, cholesteryl benzoate, and cholesteryl acetate.

In the preferred procedure for coating the phosphor particles with a liquid crystal or mixture of liquid crystal, initially the liquid crystal or mixture of liquid crystals is dissolved in a solvent. Any suitable solvent can be used, including hydrocarbons such as hexane, isooctane, toluene, xylene, cyclopentane, cyclohexane, mineral spirits, kerosene, and chlorinated hydrocarbons such as chloroform and methylene chloride, and the like. The amount of liquid crystal contained in the solvent generally ranges from about 0.5 to 10 weight percent, based upon the weight of the solvent. After dissolution of the liquid crystal, the phosphor particles are added to the stirred solution. The amount of phosphor added is such that the solution contains about 4 to 25 weight percent liquid crystal, based upon the weight of the phosphor. The liquid crystal solution containing phosphor particles suspended therein is stirred for a period of time sufficient to ensure the obtaining of a homogeneous mixture. Depending upon the amounts of liquid crystal and phosphor present, a period ranging from about 5 to 30 minutes is usually adequate. During the stirring operation, the stirred solution is generally maintained at a temperature ranging from about 50° to 200° F. The actual temperature employed depends upon the particular solvent and liquid crystal used and is such as to ensure that the liquid crystal is solubilized. After the stirring period, the solvent is removed by any suitable means, e.g., by decantation or vacuum distillation. The phosphor coated with liquid crystal is then dried, e.g., at room temperature to remove any remaining solvent, and the liquid crystal coating undergoes crystallization. It is within the purview of the invention to heat the coated phosphor to remove residual solvent and expedite the crystallization of the liquid crystal. If heat is applied, the resulting temperature should not exceed the melting point of the liquid crystal.

In forming layer 12, a plastic dielectric material, as disclosed hereinabove, is initially dissolved in a solvent. The coated phosphor, prepared as described above, is then added while stirring to the polymer solution so as to form a dispersion. The amount of coated phosphor added usually ranges from about 10 to 300 weight percent, based upon the weight of the dielectric material. The solvent used in dissolving the plastic material is one which is a nonsolvent for the liquid crystal coating. Examples of solvents that can be used include alcohols, such as ethanol, butanol and hexanol, and aprotic solvents, such as m-cresol, dimethylformamide, dimethylacetamide, dimethylsulfoxide, phosphoramide, and the like. It is to be understood that the particular solvent selected will depend upon the particular plastic dielectric employed. The selection of a solvent that meets the above-mentioned criterion can be readily made by those skilled in the art.

The dispersion or slurry prepared as described in the preceding paragraph, is applied to base plate 11 so as to form a coated phosphor-containing dielectric layer 12. Any one of the various procedures known in the art can be followed in forming layer 12. In one procedure, the dispersion is cast in place onto layer 11 after which the solvent is permitted to evaporate. Layer 12 can also be emplaced by spraying the slurry onto layer 11. In still another procedure, the dispersion can be applied to layer 11 by means of a doctor blade. In all cases the solvent is permitted to evaporate after applying the dispersion so as to form dielectric layer 12 containing embedded coated phosphor particles. It will be appreciated that the amount of solvent present in the dispersion will vary with the procedure followed. For example, when using the spraying technique, the amount of solvent used is sufficient to provide a sprayable slurry. On the other hand, a thicker slurry requiring less solvent is employed when the doctor blade method of application is followed.

When using an inorganic compound, such as barium titanate, as the dielectric material, the inorganic compound and the coated phosphor particles are thoroughly mixed. The mixing can be conveniently conducted in an alcoholic medium. The resulting slurry is then spread on the base plate to form dielectric layer 12. The layer can be hot pressed, if desired, so as to bond the particles together to ensure its integrity. It is also within the scope of the invention to use a resinous binder to bond the particles.

After placement of dielectric layer 12 on base plate 11, the light transmitting electrode in the form of layer 13 is positioned on layer 12. Light transmitting electrodes are well known in the art and can be composed of transparent sheet materials, such as glass, Mylar film (polyethylene terephthalate), Zerlon film (polymer of methylmethacrylate and styrene), and various other commercially available film formed of known transparent synthetic resins. The transparent sheets or films are coated by well known means, e.g., by vapor deposition of a metal, such as gold or silver, or an inorganic salt or oxide, e.g., one of tin, cadmium or indium to provide a conductive layer or electrode 13.

Electrodes 11 and 13 can be of any desired thickness although the thickness of light transmitting electrode is usually controlled to permit the maximum transmission of light. However, it has been found to be critical that dielectric layer 12 not exceed a thickness of 3 mils.

After assembly of the layers are described above, the layers are laminated so as to provide an integrated device. The lamination can be conveniently accomplished by hot pressing the assembled layers at a temperature ranging from about 125° to 175° F and at a pressure ranging from about 175 to 225 psi for a period of about 3 to 5 minutes. The spaced apart electrodes are then provided with electrical leads 14 and 16 to complete the device. In operation the leads are connected to a source of alternating current 17 so that an energizing potential can be applied across the electrodes. If desired, the device can be packaged in a heat sealed plastic envelope to provide added resistance to moisture.

In the foregoing description, the device has been described as having a single light transmitting electrode. However, it is within the scope of the invention to fabricate a device in which the base plate is also a light transmitting electrode.

A more complete understanding of the invention can be obtained by referring to the following illustrative examples which are not intended, however, to be unduly limitative of the invention.

EXAMPLE I

A run was conducted in accordance with the present invention in which a phosphor was coated with a liquid crystal which was then used in fabricating an electroluminescent device. A control run was also carried out in which a device was made with the same phosphor which was uncoated.

Cholesteryl decanoate (0.16g) was dissolved in 10g of toluene. To this solution there was added 10g of an electroluminescent solid particulate phosphor, namely ZnS:Cu. During the addition and for a period of about 10 minutes, the solution containing the phosphor particles was stirred. During this operation the solution was maintained at a temperature of about 100° C. (This particular liquid crystal has a melting point range of 83°–97° C, and the coating operation is carried out at a temperature slightly above, e.g., 1°–5° C above, the liquid crystal melting point temperature.) At the end of the stirring operation, the solvent was removed by decantation. The coated phosphor particles were then allowed to dry at room temperature so as to remove any residual solvent.

Polyvinyl butyral (10g) was dissolved in 70g of ethanol. To the resulting solution, the coated particles, prepared as described in the preceding paragraph, were added while stirring the solution. The dispersion so obtained was deposited on an electrode of aluminum foil after which the solvent (ethanol) was allowed to evaporate. The resulting cast in place layer of dielectric material (polyvinyl butyral) having the coated phosphor particles dispersed therein had a thickness of about 2 mils. A second electrode in the form of a layer of gold coated Mylar plastic, which was the light transmitting electrode, was placed on the dielectric layer. The assembly of the dielectric layer sandwiched between the two electrode layers was laminated by hot pressing for about 4 minutes at 150° F and 200 psi. Electrical connections were made to the electrodes, and the leads used were connected to a 115 volt, 400 cycle source of alternating current.

In the control run, the procedure described above was followed in fabricating an electroluminescent device except that uncoated ZnS:Cu phosphor particles were used.

EXAMPLE II

The electroluminescent device of this invention and the control device, fabricated as described in Example I, were placed in a 120° F and 100 percent relative humidity environment. The invention device still maintained its brightness and color after exposure for 30 days. However, the control device failed.

EXAMPLE III

The electroluminescent device of this invention and the control device, fabricated as described in Example I, were each connected to an alternating current source of 200 volts and 2500 cycles. The temperatures of the devices were continuously monitored. When the temperatures of the devices had stabilized, the temperature of the invention device was found to be from 9° to 10° F lower than the control device. During this period, the heat generated by the phosphor of the control device caused it to become distorted. There was no distortion of the invention device. The lower temperature of the invention device indicated that the liquid crystal coating functioned as a heat sink for the heat generated by the phosphor.

EXAMPLE IV

A series of runs was carried out in which electroluminescent phosphor particles were coated with different liquid crystals and electroluminescent devices were fabricated with the coated particles. Essentially the same procedures as described in Example I were followed. The following liquid crystals were employed in coating the phosphor particles: cholesteryl oleate, cholesteryl uracate, cholesteryl propionate, cholesteryl benzoate, and cholesteryl acetate.

The devices fabricated with the phosphor particles coated with the above-mentioned liquid crystals exhibited the same outstanding characteristics as the device described in Example I.

As seen from the foregoing, electroluminescent devices fabricated with the liquid crystal coated phosphors of this invention are highly resistant to moisture. Furthermore, the liquid crystal coating functions as a heat sink for heat generated by the phosphor, thereby preventing overheating, particularly at higher operating voltages and frequencies. Since damage from moisture and overheating is the principal cause of failure of electroluminescent devices, the present invention makes it possible to increase the life cycles of the devices.

As will be evident to those skilled in the art, modifications of the present invention can be made in view of the foregoing disclosure without departing from the spirit and scope of the invention.

I claim:

1. A composition consisting essentially of an electroluminescent solid particulate phosphor coated with a crystallized liquid crystal or a mixture of crystallized liquid crystals, said liquid crystal or mixture of liquid crystals melting at about the temperature to which the phosphor is heated as a result of being disposed in an electric field.

2. The composition according to claim 1 in which the liquid crystal or mixture of liquid crystals are cholesteryl esters having the following structural formula:

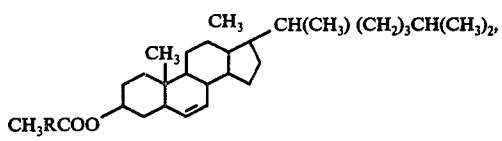

wherein R is an alkylene radical or a divalent aromatic radical.

3. The composition according to claim 2 in which the alkylene radical contains 1 to 24, inclusive, carbon atoms and the divalent aromatic radical is

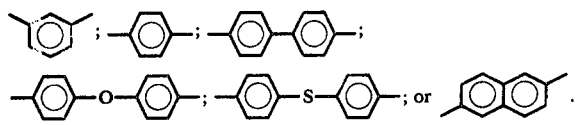

4. The composition according to claim 1 in which the phosphor is a compound selected from the group consisting of zinc sulfide, zinc selenide, boron nitride and aluminum nitride, said compound being doped with an element selected from the group consisting of copper, manganese, mercury, silver, iron and cadmium, and the liquid crystal or mixture of liquid crystals is a cholesteryl ester or mixture of cholesteryl esters.

5. The composition according to claim 4 in which the cholesteryl ester or mixture of cholesteryl esters is selected from the group of esters consisting of cholesteryl oleate, cholesteryl decanoate, cholesteryl nonanoate, cholesteryl uracate, cholesteryl propionate, cholesteryl benzoate, and cholesteryl acetate.

6. An electroluminescent device comprising a layer of electroluminescent phosphor particles coated with a crystallized liquid crystal or a mixture of crystallized liquid crystals, said liquid crystal or mixture of liquid crystals melting at about the temperature to which the phosphor particles are heated as a result of being disposed in an electric field, the coated particles being dispersed in a layer of a dielectric material having a thickness no greater than 3 mils; and an electrode member adhered to each surface of the phosphor-containing layer, at least one of the electrode members being a light transmitting layer.

7. The electroluminescent device of claim 6 in which the liquid crystal or mixture of liquid crystals are cholesteryl esters having the following structural formula:

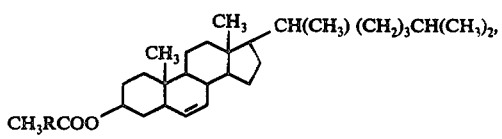

wherein R is an alkylene radical or a divalent aromatic radical.

8. The electroluminescent device of claim 7 in which the alkylene radical contains 1 to 24, inclusive, carbon atoms and the divalent aromatic radical is

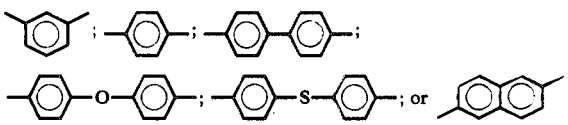

9. The electroluminescent device of claim 8 in which the coated phosphor particles are dispersed in a dielectric organic plastic material.

10. The electroluminescent device of claim 8 in which the coated particles are dispersed in a dielectric inorganic matrix.